US012654998B2

(12) United States Patent
Stöger et al.

(10) Patent No.: US 12,654,998 B2
(45) Date of Patent: Jun. 16, 2026

(54) TRAJECTORY PLANNING WITH FLEXIBLE REPLANNING FUNCTIONALITY—OBSTACLE

(71) Applicant: B&R INDUSTRIAL AUTOMATION GMBH, Eggelsberg (AT)

(72) Inventors: Andreas Stöger, Eggelsberg (AT); Thomas J. Frauscher, Eggelsberg (AT); Hubert Rams, Eggelsberg (AT)

(73) Assignee: ABB SCHWEIZ AG, Baden (CH)

( * ) Notice: Subject to any disclaimer, the term of this patent is extended or adjusted under 35 U.S.C. 154(b) by 686 days.

(21) Appl. No.: 18/071,042

(22) Filed: Nov. 29, 2022

(65) Prior Publication Data

US 2023/0166947 A1 Jun. 1, 2023

(30) Foreign Application Priority Data

Nov. 30, 2021 (AT) ................................ A50961/2021

(51) Int. Cl.
*B66C 13/06* (2006.01)

(52) U.S. Cl.
CPC .................................. *B66C 13/063* (2013.01)

(58) Field of Classification Search
CPC ........ B66C 13/063; B66C 13/04; B66C 13/08; B66C 13/18; B66C 13/23; B66C 13/48
See application file for complete search history.

(56) References Cited

U.S. PATENT DOCUMENTS 10,899,587 B2 * 1/2021 Skotschek ............ B65G 1/0464
11,167,959 B2 * 11/2021 Heimann ................ B66C 13/18
12,054,361 B2 * 8/2024 Rytkönen ................ B66C 13/46
2007/0289931 A1 12/2007 Henriksson
2015/0142277 A1 * 5/2015 Eriksson ............... B66C 15/045 701/50
2016/0185574 A1 * 6/2016 Enomoto .............. B66C 15/045 703/2
2019/0100382 A1 4/2019 Skotschek
2021/0032848 A1 2/2021 Wind et al.
2021/0206605 A1 7/2021 Rotem
2022/0089416 A1 * 3/2022 Guymon ................. B63B 27/10
(Continued)

FOREIGN PATENT DOCUMENTS

CN 111170153 5/2020
DE 10 2019 120 633 2/2021
(Continued)

OTHER PUBLICATIONS

Austria Search Report conducted in counterpart Austria Patent Appln. No. A 50961/2021 (Oct. 20, 2022).
(Continued)

*Primary Examiner* — Joseph C Rodriguez

(74) *Attorney, Agent, or Firm* — GREENBLUM & BERNSTEIN, P.L.C.

(57) ABSTRACT

An improved method for controlling a lifting device, which moves a load along a first movement direction and along a second movement direction within a specified working area of the lifting device from a starting point to an end point. Individual movements are planned for the first movement direction and for the second movement direction, by which the load is moved on while avoiding a collision with a changed or newly specified obstacle.

16 Claims, 6 Drawing Sheets

(56) References Cited

U.S. PATENT DOCUMENTS

| | | | | |
|---|---|---|---|---|
| 2022/0227367 | A1* | 7/2022 | Kario | G06V 40/103 |
| 2024/0175984 | A1* | 5/2024 | Kato | G01S 17/93 |

FOREIGN PATENT DOCUMENTS

| | | |
|---|---|---|
| EP | 2402280 | 1/2012 |
| EP | 2 965 274 | 2/2017 |
| EP | 3 461 783 | 11/2019 |
| EP | 3 653 562 | 5/2020 |
| WO | 2019/229751 | 12/2019 |

OTHER PUBLICATIONS

Europe Search Report conducted in counterpart Europe Patent Appln. No. EP 22209919 (Apr. 12, 2023).

* cited by examiner

TRAJECTORY PLANNING WITH FLEXIBLE REPLANNING FUNCTIONALITY—OBSTACLE

CROSS-REFERENCE TO RELATED APPLICATION

This application claims priority under 35 U.S.C. § 119(a) to Austria Application No. A50961/2021 filed Nov. 30, 2021, the disclosure of which is expressly incorporated by reference herein in its entirety.

BACKGROUND

1. Field of the Invention

The present invention relates to a method for controlling a lifting device that moves a load along a first direction of movement and along a second direction of movement within a specified working area of the lifting device in accordance with a specified trajectory from a starting point to an end point.

2. Discussion of Background Information

The planning of suitable trajectories is often an essential part of operational and problem-solving concepts in a wide variety of technical applications. Here, a trajectory is understood to be the temporal profile of the movement of a body along a curve, a path or a way, which in the case of a rigid body can be described, for example, by the position profile of its center of gravity. The common use of the term "trajectory" in control engineering as a temporal (reference) profile of state or output variables of a (technical) system to be controlled deviates from this definition, but does not contradict it. If a technical problem requires on the one hand the planning of a movement of a physical body, but on the other hand also the realization of the planned movement, for example by suitable control or regulation of drive elements provided for this purpose, the mentioned meanings of the term "trajectory" coincide, which is the case in many applications and also in the context of the following explanations.

Trajectory planning as described above is a basic sub-task in the automation of vehicles, such as passenger cars or trucks. With the help of map- or sensor-based data, trajectories, which primarily describe the movement of a vehicle on a road, are first planned and then implemented by the control of the vehicle as set point variables. In addition to convenience aspects, feasibility and collision-free nature of a trajectory are often important criteria when implementing this approach.

Another area in which the topic of trajectory planning is of great importance is the field of transport logistics. In order to increase the efficiency of logistics processes, among other things, rapid goods turnover is required in this division. This results in particular in requirements for rapid loading and unloading operations of cargo ships, as well as correspondingly rapid movement operations of lifting devices used for loading and unloading. Such lifting devices are also increasingly being operated in automated mode, wherein demands for fast movement operations are directly reflected in the trajectories to be implemented in (automated) operation.

Lifting devices are available in a wide variety of embodiments, which are accordingly used in a wide variety of applications. For example, there are tower cranes, which are mainly used for building construction and civil engineering, or mobile cranes, e.g., for the assembly of wind turbines. Furthermore, bridge cranes are used e.g., as indoor cranes in factory halls, or gantry cranes e.g., for the manipulation of transport containers at handling locations for the intermodal handling of goods. Goods to be transported are mainly stored in standardized containers, so-called ISO containers, which are equally suitable for the transport modes road, rail and water. Objects to be transported by a lifting device, such as a group of containers with goods contained therein, are hereinafter referred to simply as "load" or "loads".

The design and mode of operation of gantry cranes in particular are well known and are described, for example, in US 2007/0289931 A1 on the basis of a "ship-to-shore crane" (STS crane). A gantry crane has a supporting structure, or gantry, on which a boom is arranged. Here, the gantry with wheels is movably arranged on a track, for example, and can be moved in one direction. The boom is fixed to the gantry and usually has a trolley that moves along the boom. To pick up a load, such as an ISO container, the trolley is usually connected by four ropes to a load receiving element known as a spreader. To pick up and manipulate a container, the spreader can be raised or lowered by winches. The spreader can also be adapted to containers of different sizes.

Typically, cranes are operated by a crane operator, who usually controls the movement of a crane from a cabin. Such a cabin can be arranged on a gantry or on a movable trolley. For precise and collision-free manipulation of loads, high demands are placed on the crane operator, which is why a training period of at least one year is usually necessary. In particular, the rapid movement of loads with small pendulum movements represents a highly complex activity, which is why several years of practical experience is usually required to successfully perform the job of a crane operator. The job of a crane operator is often made more difficult by a high level of physical stress, due among other things to the high level of concentration required in conjunction with sitting for long periods with the gaze tilted downward. For these reasons, among others, it is a declared goal of automation technology to at least partially automate the complex manipulation procedures of a lifting device and thus simplify them for the crane operator. Inseparably linked to the automated operation of lifting device is the planning of suitable trajectories to be implemented by the lifting device in automated operation.

One issue that has received little attention to date, but is becoming increasingly important, is the replanning of existing trajectories. An example relevant to practice, in which the requirement for trajectory replanning increasingly occurs, is the STS ("Ship-to-Shore") cranes already mentioned. As mentioned, the primary purpose of STS cranes is to load containers from cargo ships onto trucks for onward transportation or onto so-called "automated guided vehicles". It is often the case that a truck has not yet arrived in an area that can be reached by the lifting device or crane, but the movement of the load must already be started for reasons of efficiency. For obvious reasons, the actual position of a truck for load pickup can only be recorded and subsequently taken into account after its arrival. In order to be able to start the movement of a container or a load even before the truck arrives, it is necessary in such cases to first assume a suitable target position for the planning of a first trajectory and to adjust the assumed target position to the true target position later in the course of replanning.

The same applies to obstacles that must be avoided by the load during the movement of the load. An obstacle here can be another ship, a stack of containers, for example on a ship or on land, or any other obstacle. In this respect, it can be advantageous for efficiency reasons to start moving a container or a load even before the dimensions of an obstacle are known, for example. Also, an obstacle may occur only during the movement of a load. In such cases, it is also necessary to make assumptions first, particularly regarding the number and shape of obstacles to be considered. Based on these assumptions, an initial trajectory can be planned, which is to be adapted to the actual obstacles in the course of a later replanning. Thus, it is necessary to replan a trajectory depending on changed obstacles.

Although the topic of trajectory planning for lifting device is addressed in the prior art, issues regarding trajectory replanning, particularly due to changing obstacles, have hardly been mentioned in the relevant literature so far.

For example, EP 3461783 B1 describes the determination of a trajectory for the movement of a load by a lifting device. For this purpose, a geometric path on the one hand and a dynamic path on the other hand are calculated, which are combined in a further step to generate a trajectory. A disadvantage of this approach is the large computational effort associated with it. A (real-time capable) replanning during the operation of a lifting device is thus only possible to a limited extent.

CN 111170153 A, on the other hand, describes a method for replanning a given trajectory on the basis of obstacles detected by measurement. The necessary measurement requirements represent a significant complication for the implementation of this method. Furthermore, CN 111170153 A does not describe how obstacles that change during operation can be taken into account and, moreover, does not make any statements about the real-time capability of the method described.

In addition, the known prior art shows a plurality of further disadvantages, such as the usually given necessity that no changes of direction along the given movement directions must result from a replanning. A further essential point is the real-time capability of concepts for trajectory replanning. Since the described replanning usually has to be done during the operation of a lifting device, the computational effort associated with replanning must not interfere with the operation of a lifting device. This aspect is also not considered in the prior art.

SUMMARY

Accordingly, it is an object of the present invention to provide an improved trajectory replanning method for a lifting device that enables efficient replanning of a trajectory along which a load is moved, taking into account a variable obstacle.

This object is solved by the present invention. In this case, the lifting device is assumed to be one that moves a load along a first movement direction and along a second movement direction within a specified working area of the lifting device in accordance with a specified trajectory from a starting point to an end point.

According to the invention, for this lifting device, at a command time point during the movement of the load, a new obstacle for the movement of the load, which is arranged between the position taken on by the load at the command time point and the end point, is specified for this lifting device and/or an existing obstacle, which is arranged between the position taken on by the load at the command time point and the end point, is changed to a new obstacle for the movement of the load, wherein, taking into account specified kinematic constraints of the lifting device, at least one individual movement is planned for the first movement direction and for the second movement direction respectively, which movement determines the further movement of the load along the respective movement direction from the command time onwards, wherein for each movement direction at least one individual movement ends in a projection of the end point onto the respective movement direction, and wherein the planned individual movements are executed in accordance with a specified movement sequence in order to move the load further along the first movement direction and along the second movement direction in accordance with a replanning trajectory resulting from the movement sequence of the planned individual movements without colliding with the obstacle. By planning individual movements, the numerical complexity is significantly reduced herein compared to methods known from the prior art, enabling efficient and flexible replanning even during operation of a lifting device.

In an advantageous manner, the individual movements planned for the first movement direction and those planned for the second movement direction are planned as independent individual movements, which means that no mutual dependencies need to be taken into account and the actual replanning task can be simplified even further.

In a further advantageous embodiment of the present invention, the position profiles of the load specified by the planned individual movements are specified as position profiles that can be continuously differentiated in time at least four times. In this manner, swinging of the moving load can be avoided in a remarkable way due to the principle.

In a further advantageous embodiment of the present invention, the position profiles specified by the individual movements are filtered by a filter with a predeterminable time constant in order to generate the temporally at least four times continuous differentiability. In this manner, it can be ensured in a particularly advantageous manner that predefined kinematic constraints of the lifting device are adhered to. The time constant of the filter can here be made dependent on the geometry of the lifting device in an advantageous manner to enable precise matching to the given lifting device.

In a further advantageous embodiment of the present invention, a second individual movement is planned for the second movement direction to move the load around the newly specified and/or the modified obstacle. It should be noted here that in order to go around an obstacle, it is usually necessary to combine the individual movement planned for going around with other individual movements planned along the other movement directions, i.e., to suitably combine horizontal and vertical movements. In this case, it may be necessary to coordinate or adapt the new individual movement to any other individual movements that may already exist. In the described manner, the load can be moved around the obstacle and collisions of the load with the specified obstacle can be avoided.

In a further advantageous embodiment of the present invention, the sequence of movements mentioned provides for an alternating start and, if necessary, overlapping execution of the planned individual movements along the first movement direction and of individual movements along the second movement direction, as a result of which, on the one hand, obstacles can be avoided and, on the other hand, time can be saved to a partly significant extent.

Furthermore, prior to the execution of at least one planned individual movement, the method according to the invention allows checking whether the expected replanning trajectory leads to a collision of the load with an obstacle specified in the working area. This check can be performed in an advantageous manner by comparing the collision times at which the respective individual movements reach projections onto the corresponding movement direction of a keypoint derived from the specified obstacle, wherein a numerical root finding method can be used to determine these collision times at which the respective individual movements reach projections onto the corresponding movement direction of a keypoint derived from the specified obstacle. In this manner, obstacles in the working area of the lifting device can be included in the replanning according to the invention, and possible collisions can be reacted to in good time. It should be noted that the procedure according to the invention allows the described check to be performed in a particularly efficient manner.

If a possible collision is detected by the described anticipatory calculation, at least one individual movement cannot be executed and instead, along the movement direction for which the at least one non-executed individual movement has been planned, a specified braking operation can be executed for at least the duration of a specified minimum braking time. Thus, on the one hand, collisions can be avoided in an advantageous manner, and on the other hand, a new starting situation is created in the described manner, from which a renewed replanning of individual movements is made possible.

According to the preceding explanations, a new individual movement can be planned for the corresponding movement direction in an advantageous manner instead of the at least one individual movement that has not been executed, wherein a replanning trajectory to be expected by the at least one new individual movement is determined and it is checked whether the replanning trajectory to be expected leads to a collision of the load with an obstacle specified in the working area, and wherein the new individual movement is executed if no collision is detected, or the specified braking operation is continued for at least one further minimum braking time, and a replanning of an individual movement as well as a check of the replanning trajectory, which is to be expected by the newly planned individual movement, is performed again if a new collision with an obstacle is detected. In this manner, the method according to the invention can be continued without collision, even if a first replanning would have led to a collision, and it can be ensured that there is no collision of the transported load with obstacles during the entire movement of the load.

Further, in support of the present invention, the position of the load can be measured and the measurement of the position of the load can be used in performing the individual movements. The use of measurement data is usually particularly advantageous for the implementation of planned individual movements by control technology.

Furthermore, it should be noted that the method according to the invention is by no means limited to movements in a plane, and that movements in (three-dimensional) space can also be planned by the present invention. In the case of more than two dimensions, the properties of the inventions at issue have an even more advantageous effect. Here, the independence of the planned individual movements should be especially emphasized, in particular since three interdependent coordinates would further increase the complexity to be mastered in replanning—compared to the already challenging 2D case.

Other exemplary embodiments and advantages of the present invention may be ascertained by reviewing the present disclosure and the accompanying drawing.

BRIEF DESCRIPTION OF THE DRAWINGS

In the following, the present invention is described in greater detail with reference to FIGS. 1 to 6, which, by way of example, show advantageous embodiments of the invention in a schematic and non-limiting manner. The drawings show.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
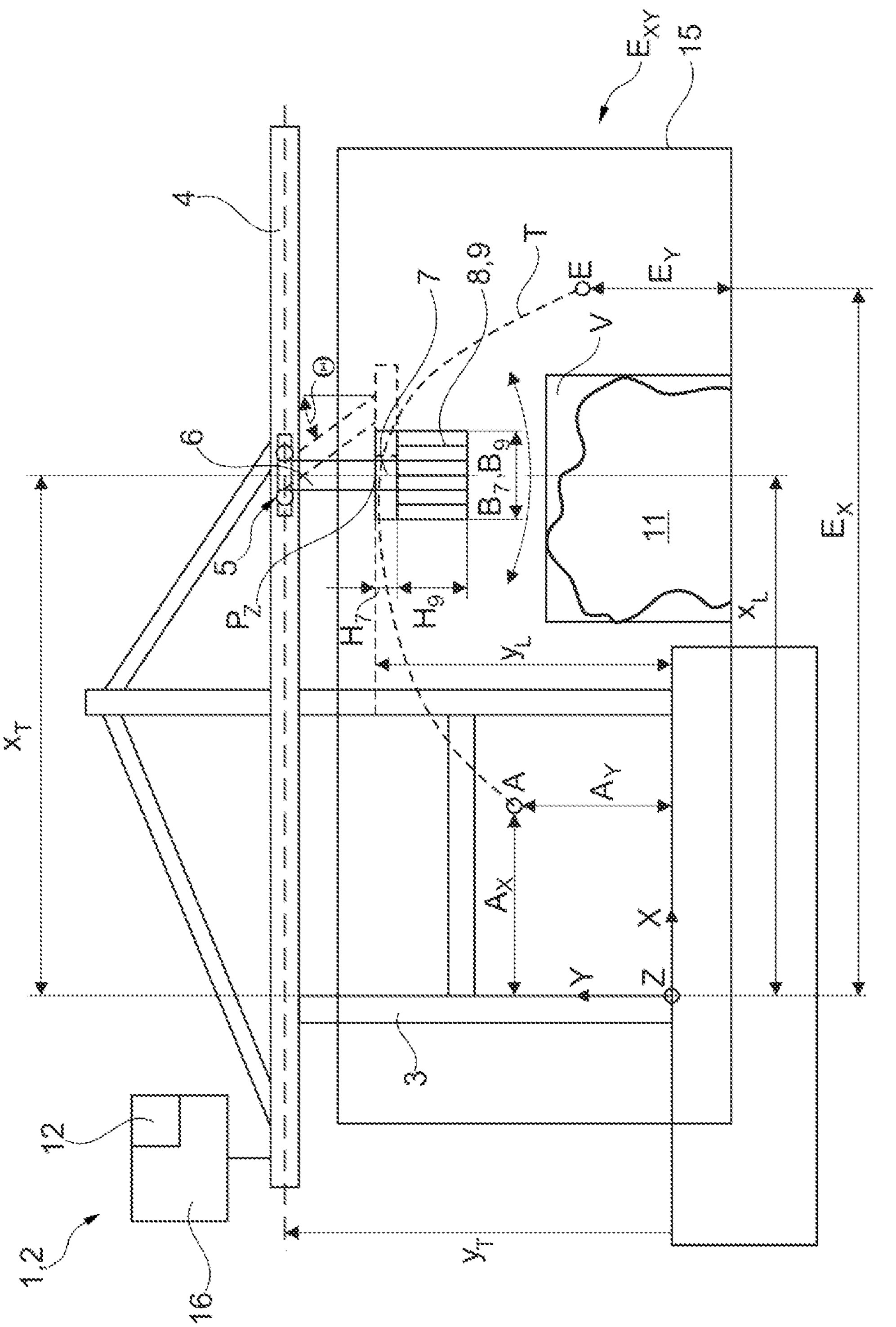
FIG. 1 a schematic representation of a container crane with a trajectory within a working area of the container crane, FIG. 2A a possible sequence of the method according to the invention when a modified obstacle is specified, FIG. 2B an individual movement in X-direction, FIG. 2C an individual movement in Y-direction, FIG. 2D a further individual movement in Y-direction, FIG. 3A a time-optimal individual movement for one movement direction, FIG. 3B a block diagram for filtering the position, velocity and acceleration profiles belonging to an individual movement, FIG. 4 a trajectory and a replanning trajectory within a working area with a prohibition zone, FIG. 5A individual movements in the X-direction when performing a braking operation according to the invention, FIG. 5B individual movements in the Y-direction when performing a braking operation according to the invention, FIG. 5C resulting trajectories when performing a braking operation according to the invention, FIG. 6 a replanning trajectory for collision avoidance in the presence of two obstacles.

FIG. 1 shows a lifting device 1 in the form of a schematic container crane 2, as used for loading and unloading ships in a harbor. Typically, a container crane 2 has a supporting structure 3 that is either fixed or movable on the ground. In the case of a movable arrangement, the supporting structure 3 can, for example, be arranged to move in the Z direction on rails. This degree of freedom in the Z direction means that the container crane 2 can be used flexibly in terms of location. To move the supporting structure 3 in the Z direction, for example, a suitable displacement device can be arranged on the lifting device, e.g., driven wheels, a cable pull, a gear drive or similar. The supporting structure 3 has a boom 4 that is fixedly connected to the supporting structure 3 at a certain height $y_T$.

A running element 5 is usually arranged on this boom 4, which is movable in the longitudinal direction of the boom 4, i.e., in the X-direction in the example shown. Accordingly, a running element 5 can be mounted in guides by rollers. A running element drive, not shown, is provided for the running element 5 in order to move the running element 5 in the X-direction. The running element drive can be provided on the running element 5 itself, but can also be arranged on the boom 4 or on the supporting structure 3. The running element 5 is usually connected by retaining elements 6 to a load receiving element 7 for receiving a load 8. In the case of a container crane 2, the load 8 is typically a container 9, in most cases an ISO container 20, 40 or 45 feet long, 8 feet wide and 8 feet, 6 inches high.

The retaining elements 6 are usually in the form of ropes, wherein in most cases four retaining elements 6 are arranged on the running element 5, but more or fewer retaining elements 6 can also be provided, in the simplest case also only a single retaining element 6. To accommodate a load 8, such as a container 9, the distance between the running element 5 and the load receiving element 7 can be adjusted by a lifting drive (not shown), thus in the Y-direction in FIG. 1. If the retaining elements 6 are ropes, the lifting height is usually adjusted by one or more rope winches. The area in which a lifting device 1 can move a load 8 is referred to in the present context as the working area 15. Depending on the size and design of the lifting device 1, the working area 15 may vary.

In the situation shown in FIG. 1, the objective is to move load 8 from starting point A to end point E. When loading a ship, the starting point A may be, for example, a position of a container 9 on land, such as on a truck trailer, a rail car, or a storage yard, and the end position E may be, for example, a specified position of the container 9 on a ship. In an advantageous manner, the working area 15 can here be defined in a plane or also in the entire movement space and it can be checked whether a specified starting point A as well as a specified end point E lie within the working area 15 and whether accordingly a continuous movement of the load 8 from the starting point A to the end point E is possible.

In order to move a load 8 along a trajectory T from the starting point A to the end point E, the lifting device 1 has a crane controller 16 with a computing unit 12, for example in the form of an electronic control unit in the form of suitable hardware and/or software, by which the movement of the load 8 along the respective movement direction X, Y, Z can be controlled. If a starting point A and/or end point E is defined manually by a user, for example, the starting point A and/or end point E can be transmitted to the computing unit 12, for example, via a suitable interface. A starting point A and/or an end point E can also be determined in the computing unit 12. Possible implementations of a computing unit 12 include microprocessor-based hardware, microcontrollers, and integrated circuits (ASIC, FPGA). The crane controller 16 communicates with the drives provided for this purpose, such as a running element drive or a winch, in order to control and/or regulate the movement of the load 8, and is typically designed to be able to detect the current position of the running element 5, the position of the load receiving element 7 and, if necessary, the position of the supporting structure 3.

In this sense, in the situation shown in FIG. 1, the coordinates of the central point $P_Z$, which is located on the upper side of the load receiving element 7 facing the boom 4, can be detected in the X-Y plane $E_{XY}$ using the coordinates $x_L$ and $y_L$ of the load receiving element 7, but it is also possible to detect the coordinates $x_T$ and $y_T$ of the running element 5 in both the X- and Y-directions. The central point $P_Z$ can be used to describe the position of the load 8 and can therefore also be understood as the load position. Furthermore, the position $y_T$ of the running element in the Y-direction is often determined by the design height of the supporting structure 3 or the boom 4 and is therefore constant. The coordinates are related to a given coordinate system. When the load 8 moves in the Z direction, that is, when the supporting structure 3 of the lifting device 1 moves in the Z direction, the position $z_L$ of the load receiving element 7 and the position $z_T$ of the running element 5 would also be detected in the Z direction.

FIG. 1 further shows an obstacle 11 arranged between starting point A and end point E. An obstacle 11 in this case can be another ship, a stack of containers 9 or any other obstacle 11. The obstacle 11 leads to the fact that no direct connection between the starting point A and the end point E, i.e. no trajectory T in the form of a straight line is possible. In order to avoid collisions or to ensure sufficient safety distance, the load 8 must avoid the specified obstacles 11 during its movement. In an advantageous manner, obstacles 11 can be taken into account by so-called prohibition zones $V_i$ (the index i≥1 here refers to the number of prohibition zones $V_i$), the prohibition zones $V_i$ enclosing the obstacles 11. Accordingly, a prohibition zone $V_i$ may also be noticeably larger than an obstacle 11 encompassed by it. For example, a prohibition zone may be defined manually by a user, e.g., via a suitable interface in the computing unit 12, or may be determined automatically by the computing unit 12. For this purpose, for example, a suitable laser scanning method can be used, which, for example, scans a working area 15 of the lifting device 1 and, in doing so, detects and measures obstacles 11 and transmits the determined data to the computing unit 12. Such methods are known in the prior art.

From a trajectory T along which the load 8 is moved, a rapid transfer of the load 8 from the starting point A to the end point E is usually required. As explained at the beginning, during such a transfer it may become necessary for several reasons to adapt a given trajectory T during the movement of the load 8 to changing circumstances in the area of the lifting device 1, i.e., to replan the trajectory T. This problem is solved by the method according to the invention. How the method according to the invention can be used to replan a trajectory T taking into account a changed or newly specified obstacle 11*n* is specifically shown in FIGS. 2A-2D.

Here, three situations are plotted along the time axis t, which can occur during the application of the method according to the invention during the movement of a load 8 by a lifting device 1 along a first and along a second movement direction, in this case along the movement directions X and Y. In the situation shown in FIG. 2A, the movement of the load 8 starts at the starting point A at the time $t_A$. The position of the load 8 is thereby equated to the previously mentioned central point $P_Z$ and accordingly also designated as $P_Z$. At time point $t_A$ the load 8 starts to move along the specified trajectory T shown in dashed lines in FIG. 2A, wherein the position $P_Z$ of the load 8 and the starting point A initially overlap. For the planning of the trajectory T the obstacle 11*a* was assumed, from which the prohibition zone $V_{1a}$ was derived.

At time point $t_K$, hereinafter also referred to as command time point $t_K$, a new obstacle 11*n* is now specified in place of the previous obstacle 11*a*. The command time point $t_K$ can be specified by an operator, such as a crane operator, and can therefore be selected as freely as possible. However, the command time point $t_K$ can also be generated internally in the computing unit 12. Also, several successive command time points $t_K$ for a repeated change of an obstacle 11 are conceivable. At command time point $t_K$, the load 8 is at position $P_z(t_K)$. According to the invention, the replanning of the movement of the load 8 is started immediately after the new obstacle 11*n* has been specified. This is done according to the previous explanations by projections of the position $P_z(t_K)$ taken on by the load 8 at the command time point $t_K$ and of the end point E onto the movement directions X, Y, as well as by projections of keypoints $S_{1n}$, $S_{2n}$, which are derived from the new obstacle 11$n$, onto the movement directions X, Y. Preferably, the keypoints $S_{1n}$, $S_{2n}$ are corner points of the prohibition zone $V_{1n}$ as shown. For the prohibition zone $V_{1a}$, keypoints $S_{1a}$, $S_{2A}$ can of course also be specified. As will be shown below, keypoints such as $S_{1n}$, $S_{2n}$ can be used as intermediate targets, particularly when planning movements along the Y-axis, to avoid collisions with a prohibition zone $V_{1n}$ and thus with the obstacle 11$_n$.

The projections of the position $P_z(t_K)$ taken on by the load 8 at the command time point $t_K$, of the end point E and of the keypoints $S_{1n}$, $S_{2n}$ on the X-axis are referred to as $P_Z'$, E', $S_{1n}'$ and $S_{2n}'$, while the projections on the Y-axis are referred to as $P_Z''$, E'', $S_{1n}''$ and $S_{2n}''$. According to the invention, the projections $P_Z'$, E', $S_{1n}'$, $S_{2n}'$ and the projections $P_Z''$, E'', $S_{1n}''$, $S_{2n}''$ are considered separately. For each of these groups of projections, individual movements TE are planned to connect the respective projections $P_Z'$, E', $S_{1n}'$, $S_{2n}'$ and $P_Z''$, E'', $S_{1n}''$, $S_{2n}''$ along the corresponding movement direction X, Y, respectively. An individual movement TE preferably defines a profile of position, velocity and acceleration along the respective movement direction. For example, by an individual movement $TE_X$ for the movement direction X, the projections $P_Z'$, E', $S_{1n}'$, $S_{n2}'$ along the movement direction X are connected. For each of the movement directions X. Y there is at least one individual movement TE. Individual movements related to movement directions such as X, Y are referred to here as $TE_X$, $TE_Y$.

In order to avoid obstacles 11$a$, 11$n$ that are located between the position $P_Z(t_K)$ taken on by the load 8 at the command time point $t_K$ and the end point E, several individual movements $TE_Y$ can be planned, in particular for the second movement direction Y. Thus, individual movements $TE_Y$ in the form of lifting movements ("Hoist Up") can be provided for the load 8 along the movement direction Y on the one hand, and individual movements $TE_Y$ in the form of lowering movements ("Hoist Down") can be provided on the other hand. To avoid obstacles 11$a$, 11$n$, lifting movements ("Hoist Up") are usually performed first, and lowering movements ("Hoist Down") are only performed after a suitable horizontal movement along the X-axis ("Move Trolley") to move the load 8 around an obstacle 11$n$ or to lift the load 8 over an obstacle 11$n$. It should be noted that in order to move a load 8 around an obstacle 11$n$, individual movements TE along the movement directions X, Y must be combined.

In the situation shown in FIG. 2, the individual movement $TE_{Y2}$ is provided as a lifting operation for the load 8 for the reasons mentioned, which first lifts the load 8 along the movement direction Y to such an extent that a collision with the obstacle 11$n$ can be ruled out. An individual movement $TE_X$ along the movement direction X already planned for transferring the load 8 to the end point E is not started in such a scenario until a collision can be ruled out as described. As mentioned, to drive around an obstacle 11, it is usually necessary to suitably combine individual movements TE along movement directions X, Y. For the planning of individual movements $TE_Y$, $TE_{Y2}$, keypoints $S_{1n}$, $S_{2n}$ can be used as mentioned. Thus, in the situation shown in FIG. 2, an individual movement $TE_{Y2}$ can be planned first, connecting the projection $P_Z''(t_K)$ to the projection $S_{1n}''$, and another individual movement $TE_Y$ can be planned, connecting the projection $S_{2n}''$ to the projection E''. Since the projections of the keypoints $S_{1n}$, $S_{2n}$ on the Y-axis are the same, i.e. $S_{1n}''=S_{2n}''$ applies, the obstacle 11$n$ can be bypassed in this specific case on the basis of the two individual movements $TE_{Y2}$, $TE_Y$ in the Y-direction in combination with an individual movement $TE_X$ in the X-direction executed between these individual movements $TE_{Y2}$, $TE_Y$ in the Y-direction.

In this context, it should be noted that along the X-axis, a single individual movement $TE_X$ from the projection $P_Z'(t_k)$ to the projection E' is usually sufficient to ensure a collision-free movement of the load 8 into the end point E. It should also be noted at this point that the present invention also covers the case where an obstacle 11$a$ previously assumed for planning a trajectory T subsequently turns out not to exist, i.e. the obstacle 11$a$ disappears. In such a case, a single individual movement $TE_Y$ along the Y-axis is sufficient to transfer the load 8 from its position $P_Z(t_K)$ to the end point E.

After planning the individual movements TE, the planned individual movements TE are executed according to a specified sequence, hereinafter referred to as "movement sequence", to move the load 8 along the first movement direction X and along the second movement direction Y. Thus, a replanning trajectory TU results from the planned individual movements TE. The replanning trajectory TU is shown by the solid line in FIG. 2.

Figures 2A, 2B, 2C, 2D:
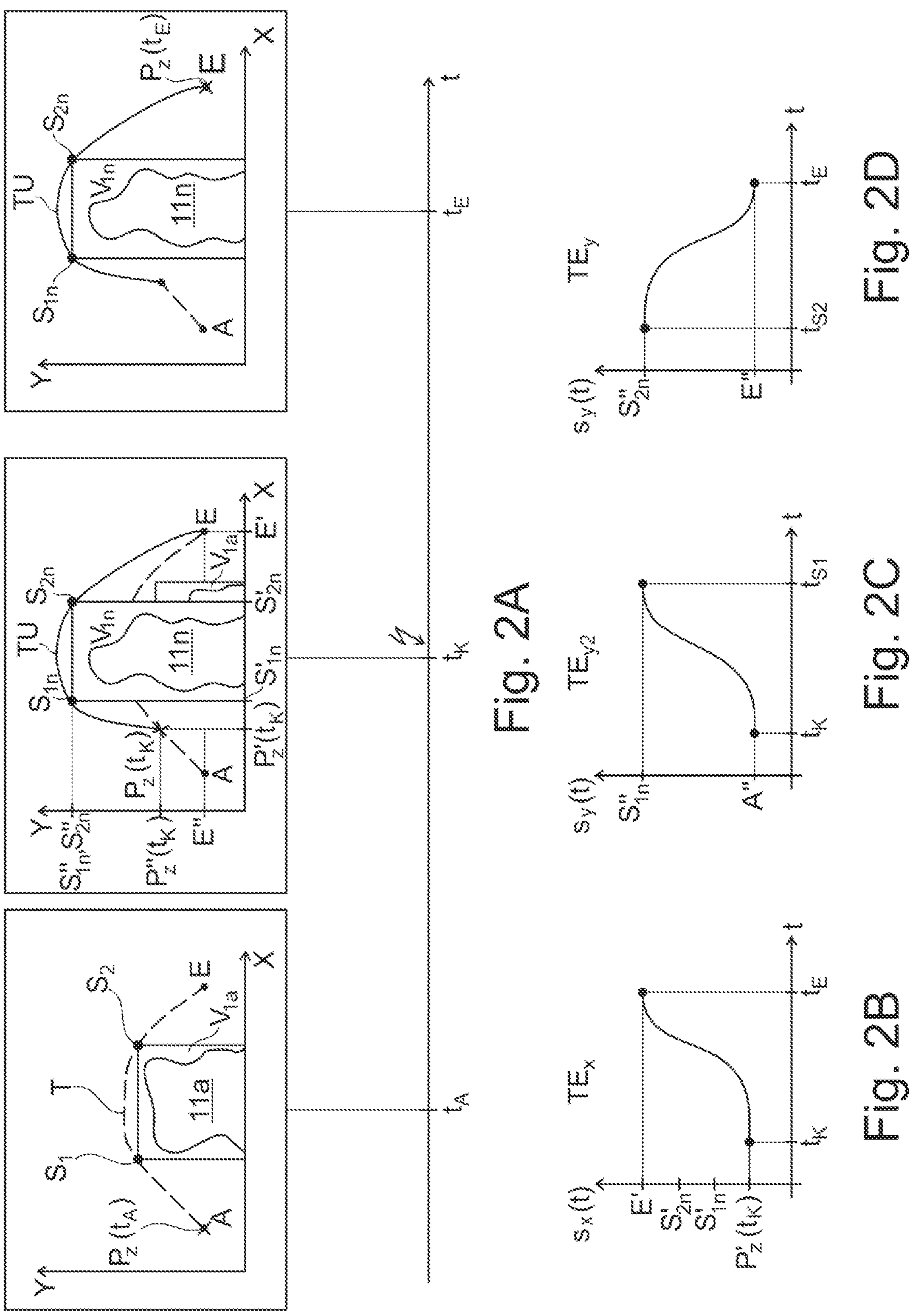

Individual movements TE, as may occur in the method according to the invention, are shown in FIGS. 2B, 2C and 2D. Corresponding to the individual movement $TE_X$ shown in FIG. 2B, in which the position profile $s_x$ connects the projection $P_Z'(t_k)$ with the projections $S_{1n}'$, $S_{2n}'$ and with the projection E', the planning of an individual movement TE with regard to its temporal position profile $s_x$ can be performed, for example, by specifying a sigmoid-like profile, which, however, is to be understood merely as an example. Other position profiles can also be used at this point.

FIG. 2C shows a corresponding individual movement $TE_{Y2}$ along the Y-direction, by which the projections $P_z''(t_k)$ and $S_{1n}''$ on the Y-direction are connected. Accordingly, the individual movement $TE_{Y2}$ represents a lifting movement described before, and ends at the time point $t_{S1}$ in the projection $S_{1n}''$. Finally. FIG. 2D shows the individual movement $TE_Y$ that starts at time point $t_{S2}$ and that lowers the load 8 starting from the projection $S_{2n}''$ to the end point E''. In this regard, it should be noted that, particularly for lifting movements in the Y-direction, it is not usually required that the speed of the load 8 in the Y-direction be zero at the end of the lifting movement. Thus, a load 8 is lifted beyond the projections $S_{1n}''$ or $S_{2n}''$, which increases the safety distance to obstacles 11 and is thus advantageous. As a result, a resulting replanning trajectory TU usually does not pass directly through the keypoints $S_{1n}$ or $S_{2n}$, but goes around them.

By separating the new overall movement to be planned into a plurality of individual movements TE to be planned instead, the (re-)planning task to be solved is significantly simplified compared to methods known from the prior art. Thus, the complex problem of planning at least one two-dimensional movement is reduced to planning several only one-dimensional movements. Especially this circumstance proves to be advantageous in the practical implementation, since the planning of one-dimensional movements is a well-known problem in control and automation engineering, which has already been solved in various ways. In the concrete planning of the individual TE movements, a plurality of known approaches can thus be used. If, for example, a transfer of the load 8 to the end point E is to be ensured by time-optimal individual movements TE, the bang-bang controller approach, for example, which is sufficiently known from control engineering literature, can be used, using maximum accelerations along the movement directions X, Y that can be realized by the given drives of the lifting device 1.

Figure 3A:
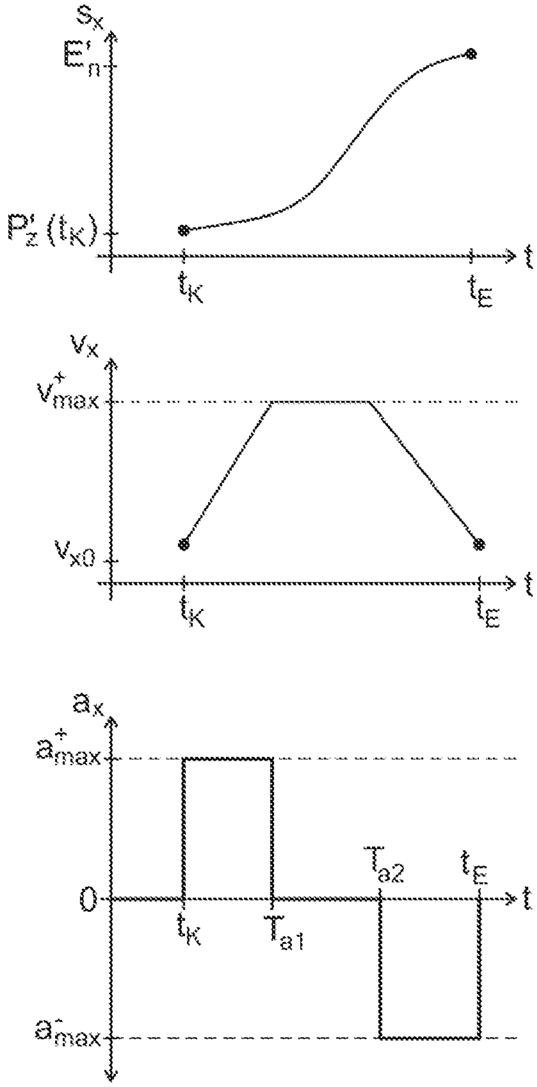

In FIG. 3A, the planning of a time-optimal individual movement TE to connect the projections $P_Z$' and E' is explained in more detail. In addition to the position profile $s_x$, the associated velocity profile $v_x$ and the associated acceleration profile $a_x$ along the X-axis are also shown. The most significant dynamic limitation to be considered in the planning of a time-optimal individual movement TE are kinematic constraints of the drives of the lifting device 1, such as a maximum realizable acceleration of the drives or a maximum force realizable by the drives. These kinematic constraints result in limitations for the accelerations of the load 8 that can be realized along the respective movement directions X, Y. The maximum possible positive acceleration of load 8 is referred to as $a^+_{max}$, and the maximum possible negative acceleration of load 8 is referred to as $a^-_{max}$. In this sense, the fastest possible individual movement TE along the X-axis is achieved using the maximum possible positive accelerations $a^+_{max}$ and the maximum possible negative accelerations $a^-_{max}$ along the X-axis.

In the example shown in FIG. 3A, the displayed position, velocity and acceleration profile can be mathematically represented as $$a_x(t) = a^+_{max}(\sigma(t-t_k)-\sigma(t-T_{a1})) + a^-_{max}(\sigma(t-T_{a2})-\sigma(t-t_E))$$

$$v_x(t) = v_{x0} + a^+_{max}(\sigma(t-t_k)-\sigma(t-T_{a1}))\cdot(t-t_k) + a^+_{max}\cdot\sigma(t-T_{a1})\cdot(T_{a1}-t_k) + a^-_{max}(\sigma(t-T_{a2})-\sigma(t-t_E))\cdot(t-T_{a2}) + a^-_{max}(\sigma(t-t_E))\cdot(t-T_{a2})$$

$$s_x(t) = P'_Z(t_k) + v_{x0}t + a^+_{max}(\sigma(t-t_k)-\sigma(t-T_{a1}))\cdot\frac{(t-t_k)^2}{2} + a^+_{max}\cdot\sigma(t-T_{a1})\cdot(T_{a1}-t_k)\cdot(t-T_{a1}) + a^-_{max}(\sigma(t-T_{a2})-\sigma(t-t_E))\cdot\frac{(t-T_{a2})^2}{2} + a^-_{max}(\sigma(t-t_E))\cdot(T_{a2}-t_E)\cdot(t-t_E)$$

σ(x) stands herein for the sigma function well known from mathematics, which takes on the value one for arguments greater than or equal to zero ($x \geq 0$), and is equal to zero otherwise. $v_{x0}$ stands herein for the initial velocity at the beginning of the individual movement. Accordingly, the planning of individual movements TE, on the basis of which a position profile $s_x$, a velocity profile $v_x$ and an acceleration profile $a_x$ are determined, can be performed by defining functions as shown above, for example by specifying time points $T_{a1}$ and $T_{a2}$. In an advantageous manner, boundary conditions can also be specified for this purpose, such as $s_x(t_E)$=E', $v_x(t_E)=v_{tE}$. In particular, the velocity $v_{tE}$ can be chosen equal to zero, but also different from zero.

According to the above explanations, for planning a time-optimal individual movement TE, acceleration phases with maximum positive acceleration $a^+_{max}$, with maximum negative acceleration $a^-_{max}$, as well as with vanishing acceleration, i.e. an acceleration $a_x=0$, must be specified. In the procedure shown in FIG. 3A, this is done by specifying time points $T_{a1}$ and $T_{a2}$, which limit the time of the acceleration phases mentioned. The velocity profiles $v_x$ and position profiles $s_x$ associated with the acceleration profile $a_x$ adjust themselves according to the specified acceleration profiles. The widths of the acceleration phases limited by the time points $T_{a1}$ and $T_{a2}$ with accelerations different from zero are usually specified in such a manner that the resulting velocities do not exceed specified limits $v^+_{max}$, $v^-_{max}$. It should be noted that for the acceleration of the load 8 along the movement directions X, Y, lower (constant) values than the maximum accelerations that are possible due to the kinematic constraints of the drives can also be specified.

Kinematic and/or geometric limit values can, for example, be stored in the computing unit 12 or specified to the computing unit 12. Further kinematic limit values are preferably a maximum speed $v_{Tmax}$ and/or a maximum acceleration $a_{Tmax}$ of the running element 5, or a maximum speed $v_{Hmax}$ and a maximum acceleration $a_{Hmax}$ of the lift drive in Y-direction. A geometric limitation can be given, for example, by a maximum deflection angle $\Theta_{XYmax}$ of the load receiving element 7 in the plane $E_{XY}$. In the case of a third movement direction of the lifting device in the Z direction, a maximum speed $v_{Smax}$ and a maximum acceleration $a_{Smax}$ of the supporting structure 3 can additionally be specified as kinematic limit values and a maximum deflection angle $\Theta_{ZYmax}$ of the load receiving element 7 in the plane $E_{ZY}$ can be specified as a geometric limit value. However, in addition to planning time-optimal individual movements TE, other approaches to planning individual movements TE can also be used.

In many cases, it proves advantageous in this context to plan the individual movements $TE_x$, $TE_y$ (and if necessary $TE_z$) along the axes X, Y (and if necessary Z) independently of one another. This means that there is no relationship between the planned individual movements $TE_x$, $TE_y$ (or $TE_z$) on the respective axes, which could be expressed mathematically, for example, and which, in the case of a change in the position $P_z$ of the load 8 along a first movement direction, for example the X-axis, would cause a change in the position $P_z$ of the load 8 also along a second movement direction, for example the Y-axis.

The planned individual movements TE are subsequently executed either simultaneously or offset in time. Staggering planned individual movements TE may be necessary, particularly in the case of prohibited areas $V_i$ or obstacles 11 described above. For example, it may be necessary to delay the start of a lowering movement in the Y-direction in order to drive around an obstacle 11. An individual movement $TE_Y$ planned in the Y-direction would therefore only be started with a time delay after the individual movement planned in the X-direction has already been started. The specification of which individual movement TE is to be executed first and which individual movement TE is to be executed later, if necessary, is expressed in the context of the present invention by a so-called movement sequence, which can be specified, for example, to the crane controller 16 or to the computing unit 12 provided in the crane controller 16 via a suitable interface. A movement sequence can thus be stored in the computing unit 12. A movement sequence thus defines the order in which the planned individual TE movements are to be executed. For example, a movement sequence might be: "First horizontal movement in X-direction, only then vertical movement in Y-direction." A movement sequence can also be in the form of a table in which TE start times are assigned to the planned individual movements at which they are started. A movement sequence can also comprise time intervals that define waiting times that must at least be provided between the start times of successive individual movements TE.

A central problem in the manipulation of loads 8 by lifting devices 1, which in many cases can either be solved, but usually at least greatly reduced, by suitable trajectory planning, is the problem of load swing. In particular, rapid movement operations of lifting devices can often excite undesirable swinging and/or swaying movements of transported loads 8 or of load receiving elements. Swinging of loads 8 can in turn delay handling and manipulation procedures, since loads such as containers often cannot be placed at all in such cases, or at least not with sufficient precision, and it is necessary to wait until a given swinging has subsided again. In FIG. 1, the possibility of forming swinging and/or pendulum movements is shown by a double arrow in the X-Y plane $E_{XY}$.

In the present context, it is shown that so-called flat trajectories, i.e., trajectories which can be continuously differentiated a sufficient number of times depending on the concrete design of the lifting device, are effective against (load) swinging and/or pendulum movements. This approach is based on the fact that a lifting device 1 as shown in FIG. 1 is a "flat system" in the control engineering sense. Flat systems are known to have a so-called flat output.

Flat outputs and their derivatives allow, in the case of a flat system such as the lifting device 1 under consideration, the representation (also "parameterization") of the internal state or system variables of the flat system. The internal state or system variables of a flat system can thus be represented as functions of the flat outputs and their derivatives, which, of course, the person skilled in the art of control engineering knows about. For the suppression of swinging of a load 8 transported by a lifting device 1, the fact that (in an ideal consideration) a control system constructed with the aid of a flat output cannot excite any swinging or pendulum movements of the load is of importance at this point.

In the case of the lifting device 1 considered here, the position profiles of the load 8 along the movement directions X, Y represent flat outputs of the system "lifting device" 1. Here it is shown that for the suppression of swinging and/or pendulum movements it is sufficient to specify the position profiles $s_x(t)$, $s_y(t)$ determined by the planned individual movements TE as four times continuously time-differentiable position profiles $s_x(t)$, $s_y(t)$. In this manner, swinging and/or pendulum movements can be suppressed without having to rely on measurements of the load position $P_Z$. It should be mentioned at this point that the use of trajectories that can be continuously differentiated even more often can ensure even smoother movement profiles that are even gentler on the drives.

To ensure that the position profiles $s_x(t)$, $s_y(t)$ defined by the specified individual movements TE are actually fourfold continuously differentiable, the position profiles $s_x(t)$, $s_y(t)$ can be filtered before they are executed. However, the described fourfold differentiability can also be achieved in a manner other than filtering, for example by polynomial approaches for the specified position, velocity and/or acceleration profiles. The filtering of individual movements TE, which are available as scalar progressions, is much easier than the filtering of multidimensional profiles. This is another reason why the use of individual movements TE represents a significant advantage in the control of lifting devices 1.

The described approach for generating flat trajectories by a suitable filtering or polynomial approach can also be used in a particularly advantageous manner to comply with the kinematic constraints for the lifting device drives mentioned further above as well as the geometric limitation of the deflection angle of the load. For example, the partial movements of the load 8 are related to the movement of the running element 5 via the known pendulum equations:

$$x_T = x_L + \frac{\ddot{x}_L(y_r - y_L)}{\ddot{y}_L + g}$$

$$v_T = \dot{x}_L - \frac{\dot{y}_L\ddot{x}_L - (y_T - y_L)\dddot{x}_L}{\ddot{y}_L + g} - \frac{(y_T - y_L)\ddot{x}_L\dddot{y}_L}{(\ddot{y}_L + g)^2}$$

$$a_T = \ddot{x}_L - \frac{\ddot{y}_L\ddot{x}_L + 2\dot{y}_L\dddot{x}_L - (y_T - y_L)x_L^{(4)}}{\ddot{y}_L + g} + \frac{2\dot{y}_L\ddot{x}_L\dddot{y}_L - 2(y_T - y_L)\dddot{x}_L\dddot{y}_L - (y_T - y_L)\ddot{x}_L y_L^{(4)}}{(\ddot{y}_L + g)^2} + \frac{2(y_T - y_L)\ddot{x}_L\dddot{y}_L^2}{(\ddot{y}_L + g)^3}$$

The variables $x_T$, $v_T$, $a_T$ here stand for the movements of the running element 5, $x_L$ and $y_L$ on the other hand for the coordinates of the load 8, whose corresponding derivatives are noted as $$\dot{x}_L, \ddot{x}_L, \dddot{x}_L, x_L^{(4)}$$

and so on. According to the above, the given equations represent a flat parameterization of the state variables $x_T$, $v_T$, $a_T$ as a function of the flat outputs $x_L$, $y_L$. The given relationship makes it clear that specifications regarding the profiles of the coordination $x_L$ and $y_L$ have a direct effect on the movement of the running element 5.

Figure 3B:
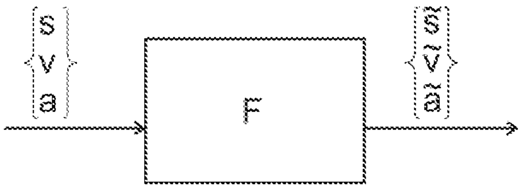

To implement the described filtering to generate flat trajectories, for example, a suitable filter F can be used, such as a moving-average filter (MA filter). A schematic representation of such filtering is shown in FIG. 3B. In this context, FIG. 3B shows a general filter F that takes position profiles s, velocity profiles v, and acceleration profiles a, and outputs filtered position profiles $\tilde{s}$, velocity profiles $\tilde{v}$, and acceleration profiles $\tilde{a}$. The filter F can be designed to also output time derivatives of the mentioned variables, particularly of incoming acceleration profiles. The filter F can be designed as a single-input system, and only one of the mentioned variables position s, velocity v and acceleration a can be recorded and filtered and output again. However, the filter F can also be designed as a multiple-input system and process several variables simultaneously. In a known manner, the filter F may be implemented in the control unit 12.

The filter time $\tau_{filt}$ of a filter F implemented as an MA filter can be selected here in a particularly advantageous manner as a function of the geometry of the lifting device 1 and the pendulum equations. By selecting larger time constants, the previously planned individual movements can be filtered even more strongly and, for example, even more conservative progressions can be specified for the running element. By multiple filtering, individual movements TE can be generated in an extremely advantageous manner, by which kinematic constraints specified for the drives of the lifting device 1 are taken into account, such as speed, acceleration, jerk limitations.

Figure 4:
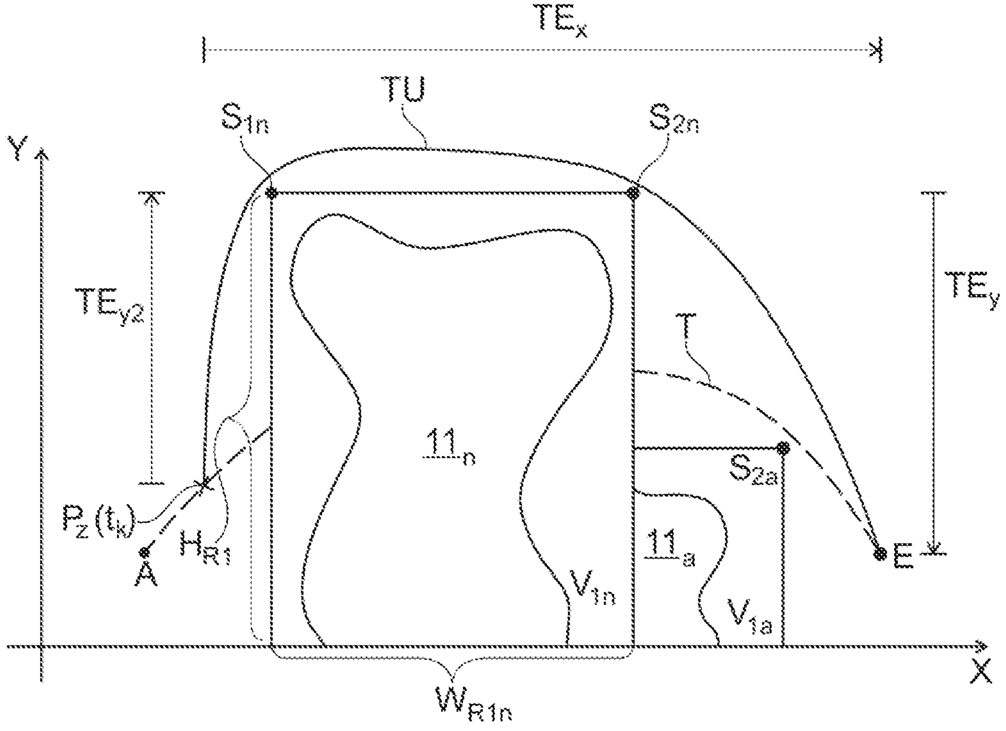

How prohibition zones $V_i$ can be defined in concrete terms is further shown in more detail in FIG. 4. For example, an envelope of an obstacle 1 in the shape of a rectangle can be used which completely includes the obstacle 11. Here, the height $H_{R1}$ of the rectangle corresponds at least to the maximum extension of the obstacle 11 in Y-direction and the width $W_{R1}$ of the rectangle corresponds at least to the maximum extension of the obstacle 11 in X-direction. This is only to be understood by way of example; of course, other geometric definitions of prohibition zone $V_1$ are also conceivable. In general, for example, a single prohibition zone $V_1$ may enclose multiple obstacles 11. However, a finer definition of multiple prohibition zones $V_1$ may be applied, e.g., based on the specific outlines of the obstacles 11.

In a situation such as that shown in FIGS. 1 and 4, the sequence in which the planned individual movements TE are executed is of decisive importance. As can be seen directly from FIG. 4, starting from the command time point $t_k$, a lowering movement in the Y-direction by the individual movement $TE_Y$ may only be executed when a collision with the obstacle 11 can be ruled out. According to the invention, in order to determine the sequence in which the planned individual movements TE are executed, a so-called movement sequence is specified, which determines the sequence in which the specified individual movements TE are to be executed and at which time points these individual movements TE are started.

A first possibility in this respect is to execute the planned individual movements TE at intervals from one another, i.e., to wait after executing an individual movement TE and only continue with the next individual movement TE corresponding to the movement sequence after a specified waiting time.

Specifically, a movement sequence can specify, for example, that in the situation shown in FIG. 4, first a lifting movement $TE_{Y2}$ is executed in the Y-direction as an individual movement ("Hoist Up"), then the vertical individual movement $TE_x$ is executed in the X-direction ("Move Trolley"), and only then the individual movement $TE_{Y1}$ is executed in the Y-direction as a lowering movement ("Hoist Down"). The waiting time between these individual movements $TE_X$, $TE_Y$, $TE_{Y2}$ can be predefined or determined depending on the situation. For example, it is possible to wait until the individual movement $TE_{Y2}$ is completed, and only after its completion to start the next individual movement $TE_X$, either along the same movement direction X, Y or along a different movement direction X, Y. In this manner, however, time is lost due to the waiting times to be provided between the various individual movements $TE_X$, $TE_Y$, $TE_{Y2}$. In an advantageous manner, the planned individual movements TE can also be executed overlapping in time for this reason. Overlapping in time means here that, for example, an individual movement in the Y-direction is already started before an individual movement in the X-direction is completely finished. Such an overlap of individual movements TE can also be recorded in a movement sequence within the scope of the present invention.

In the course of determining the movement sequence in which the planned individual movements are to be executed, it is often particularly advantageous to additionally check whether a collision of the load 8 with a prohibition zone $V_i$ may occur in the profile of the resulting replanning trajectory TU.

Figure 5A:
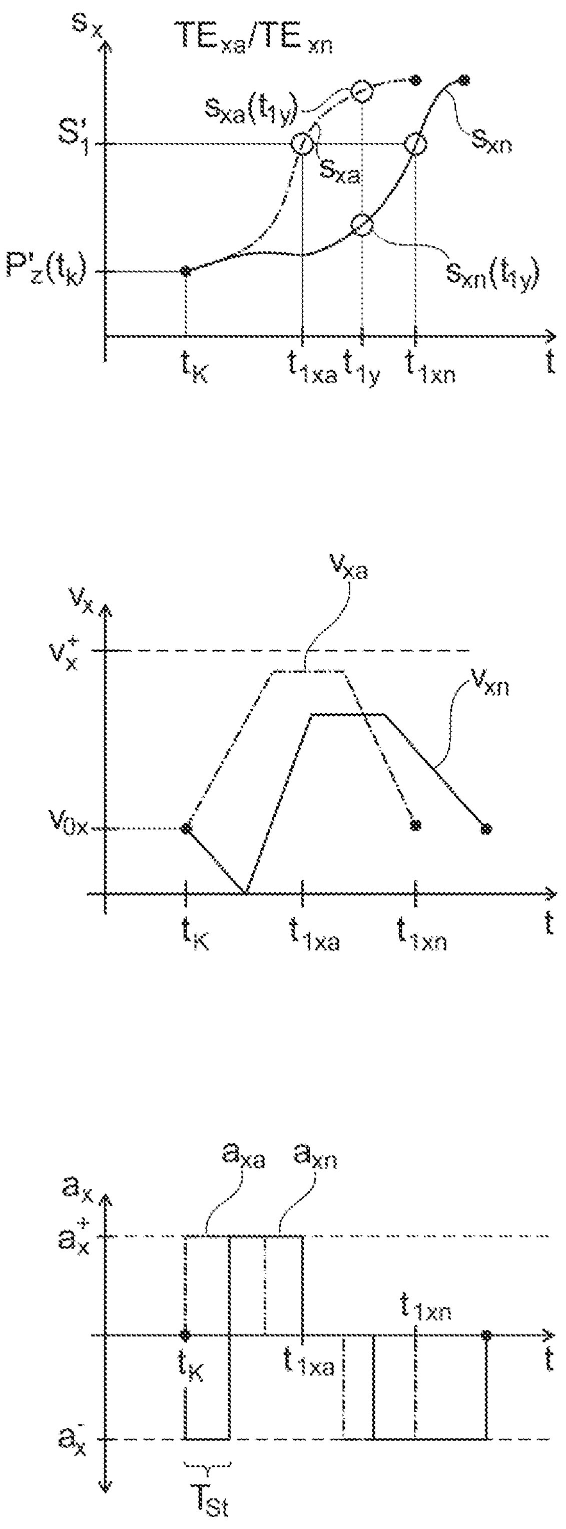
Figure 5B:
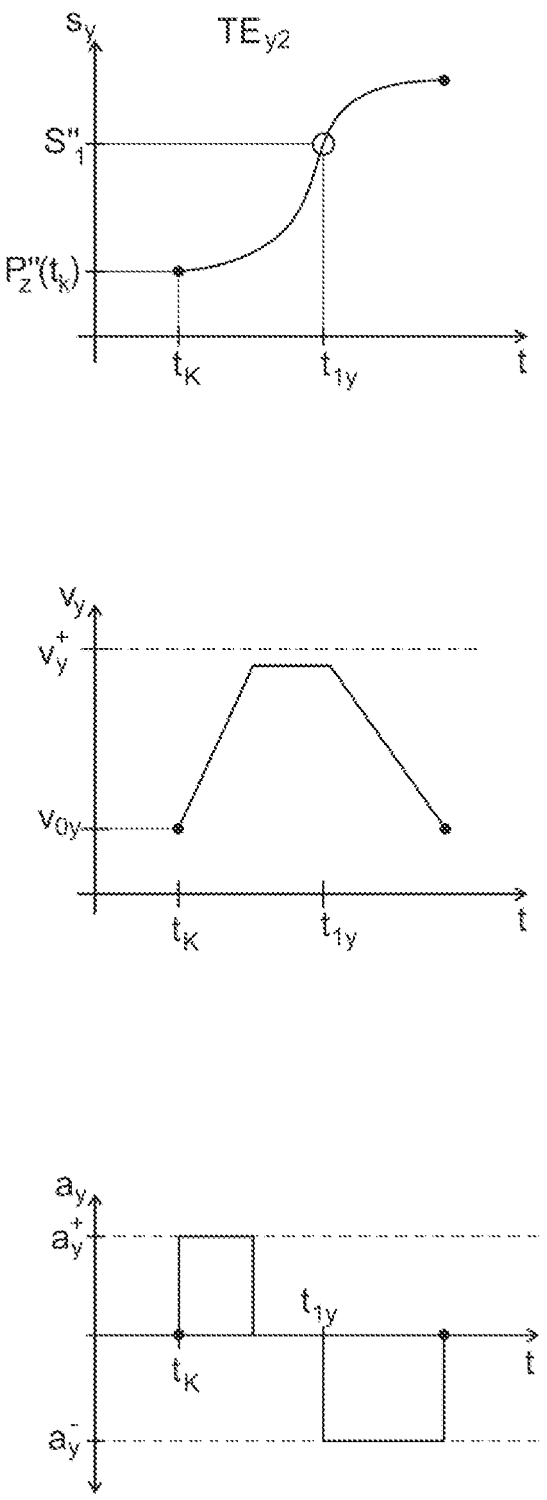
Figure 5C:
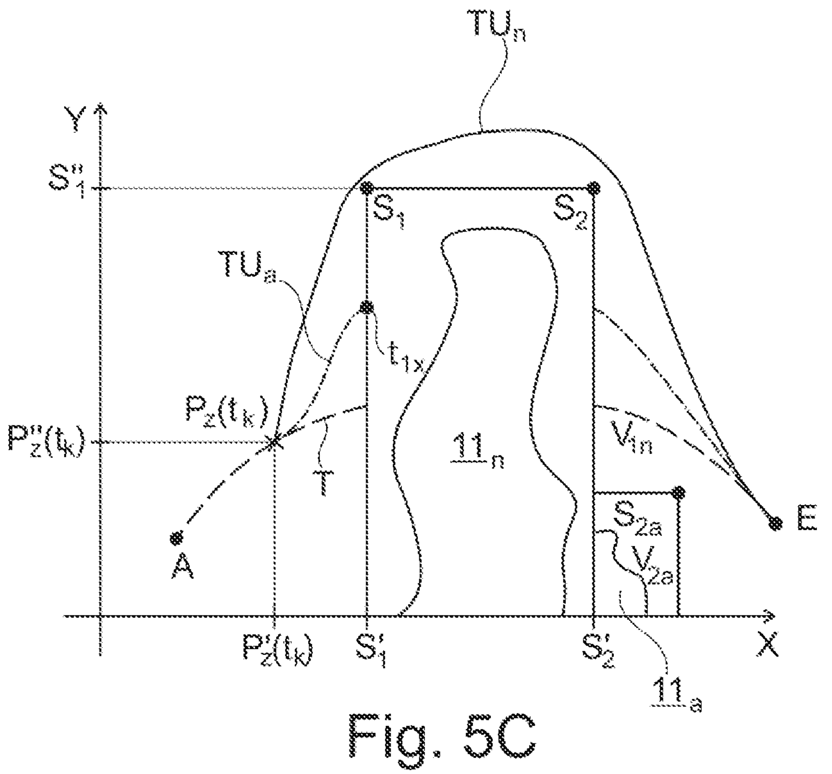

How to proceed in this respect is shown in FIGS. 5A-5C. FIG. 5A and FIG. 5B show on the one hand acceleration, velocity and position profiles ($a_x$, $v_x$, $s_x$ and $a_y$, $v_y$, $s_y$) for the movement directions X and Y, as they can be used for replanning the movement of a load 8 according to the invention. In the situation shown, the load 8 is located to the left of a newly specified obstacle 1 in at the command time point $t_K$, as can be seen in FIG. 5C. Accordingly, the individual movements $TE_{Y1}$, $TE_{Y2}$ planned in the Y-direction can be adopted without restriction. Purely by a movement in Y-direction, starting from the position $P_z(t_k)$, no collision can be caused.

In the X-direction, however, it can be seen that the individual movement $TE_{xa}$ would lead to a collision with the obstacle 11. The individual movement $TE_{xa}$ planned at the beginning is shown in FIG. 5A by the dash-dotted profiles $s_{xa}$, $v_{xa}$ and $a_{xa}$. In combination with the lifting movement $TE_{Y2}$ planned for the Y-direction, the first replanning trajectory $TU_1$ shown in FIG. 5C would result, which, however, would cause a collision with the new prohibition zone $V_{1n}$. For this reason, the individual movement $TE_X$ initially planned for the X-direction is not executed and instead a braking operation is performed for a specified duration $T_{St}$. The braking operation corresponds to the phase with negative acceleration provided at the beginning in FIG. 5A. Based on this, a new individual movement $TE_{xn}$ is planned in the X-direction and this is executed instead of the previously planned, old individual movement $TE_{xa}$ at the end of the braking operation.

In a particularly elegant manner, a check as to whether a collision with an obstacle is to be expected can be performed in the following manner: Before the execution of at least one planned individual movement TE, so-called collision times $t_{iX}$, $t_{iY}$ are determined and compared with one another. The collision times $t_{iX}$, $t_{iY}$ are to be understood as the respective time points at which the load 8 would reach a projection $S_i'$ or $S_i''$ of a keypoint $S_i$ derived from a prohibition zone $V_i$ placed around an obstacle 11 on the respective movement direction X, Y by the respective planned individual movements $TE_X$, $TE_Y$.

As mentioned, keypoints $S_i$ are preferably corner points of prohibition zones $V_i$. In order to check whether an expected replanning trajectory TU would lead to a collision of the load 8 with an obstacle 11 specified in the working area 15, it can be checked in the situation shown in FIG. 5C whether the corresponding collision time $t_{1X}$ for the individual movement $TE_{Xa}$ along the X-axis lies before the corresponding collision time $t_{1X}$ for the individual movement $TE_{Y2}$ along the Y-axis, i.e. $t_{iX}<t_{iY}$ applies (specifically transferred to FIG. 5C, the inequality would be $t_{1X}<t_{1Y}$). In this case, a collision can be concluded in the situation shown in FIG. 5C. The corresponding collision times $t_{ix}$, $t_{iy}$ are shown in FIGS. 5A and 5B.

In the procedure described, particular attention must be paid to the Y-coordinate of the load position $P_Z$, i.e., the projection $P_Z''$ of the load position $P_Z$ on the Y-axis. It must be taken into account whether the Y-coordinate $P_Z''$ of the load position $P_Z$ at the beginning of an individual movement $TE_Y$ in the Y-direction is larger or smaller than the projection $S_i''$ of the next keypoint $S_i$ in the Y-direction onto the Y-axis. In many practically relevant cases, the load position $P_Z$ at the beginning of a newly planned individual movement TE is given by the load position $P_Z$ at command time point $t_k$, i.e. $P_Z(t_k)$. If the projection $S_i''$ of the keypoint $S_i$ closest in Y-direction to the Y-axis is smaller than the projection $P_Z''$ of the load position $P_Z$ to the Y-axis, the condition for a collision is fulfilled exactly if vice versa $t_{iY}<t_{iX}$ applies.

Individual movements $TE_X$, $TE_Y$ are often not available in analytical form. In an advantageous manner, numerical root finding methods can also be used in such cases to determine the collision times $t_{iX}$, $t_{iY}$, such as the well-known bisection method or Newton's method.

In practical implementation, it is often advantageous to combine both analytical and numerical methods in order to determine the collision times $t_{iX}$, $t_{iY}$. Such a case is described below. The acceleration profiles $a_x$ and $a_y$ are initially specified as piecewise constant as described. For these piecewise constant acceleration profiles $a_x$ and $a_y$, the corresponding position profiles $s_x$ and $s_y$ can easily be calculated analytically. For the resulting analytical descriptions of the position profiles $s_x(t)$ and $s_y(t)$, the collision times $t_{iX}$, $t_{iY}$ can be calculated with little effort, e.g. by determining the zeros $t_{x0}$, $t_{y0}$ of the functions $f_x(t)=s_x(t)-Si'$, $f_y(t)=s_y(t)-Si'$. For these zeros $t_{x0}$, $t_{y0}$, accordingly $f_x(t_{x0})=f_y(t_{y0})=0$ is valid by definition. Of course, the formulas $f_x(t)$ and $f_y(t)$ can also take into account the height and width of the load 8, which are usually given by the height $H_7$ of the load receiving element 7 plus the height $H_9$ of a container 9 in the Y-direction, as well as half the width $B_7$ of the load receiving element 7 (typically corresponding to half the width $B_9$ of the container 9). Depending on whether the load 8 approaches the next keypoint $S_i$ from the left, right, top or bottom, the function $f_x(t)$, for example, can be increased or decreased by half the width $B_9$.

If the individual movements $TE_X$, $TE_Y$ are filtered, for example by an MA filter described at the beginning, the position profiles $s_x(t)$ and $s_y(t)$ in particular are filtered to form filtered position profiles $\tilde{s}_x(t)$ and $\tilde{s}_y(t)$. For such filtered position profiles $\tilde{s}_x(t)$ and $\tilde{s}_y(t)$, the property of an MA filter can now be utilized, according to which the zeros $t_{x0}$, $t_{y0}$ determined from the function $f_x(t)$ shown above can be shifted by filtering by a maximum of the filter time $\tau_{filt}$ of the MA filter used for filtering. Accordingly, for the case of twofold filtering, a time interval of length $2\cdot\tau_{filt}$ can be placed around the previously determined zeros $t_{x0}$, $t_{y0}$, with the zeros $t_{x0}$, $t_{y0}$ at the beginning of the interval at the left interval boundary. In such a time interval, a bisection procedure can now be used to search for zeros of the functions $$\tilde{f}_x(t) = \tilde{s}_x(t) - S_i' \text{ and } \tilde{f}_y(t) = \tilde{s}_y(t) - S_i''.$$

These zeros then correspond to the sought collision times $t_{iX}$, $t_{iY}$ for the filtered position profiles $\tilde{s}_x(t)$ and $\tilde{s}_y(t)$.

Besides the described comparison of two collision times $t_{iX}$, $t_{iY}$, another approach for collision checking can be mentioned. Thus, initially only the collision time $t_{iy}$ can be calculated, which indicates when a projection of a given keypoint $S_i''$ onto the Y-axis is reached along the Y-axis by a planned individual movement $TE_Y$ in Y-direction. This collision time $t_{iy}$ can also be used to determine the position $s_x(t_{iy})$, which describes the position on the X-axis specified by the planned individual movement $TE_x$ in the X-direction at the collision time $t_{iy}$.

The check whether a collision with an obstacle 11 is to be expected due to planned individual movements TE can then be performed by comparing the position $s_x(t_{iy})$ with the projection Si' of the keypoint Si on the X-axis. In the specific case shown in FIG. 5A-5C, for example, a collision can be concluded if one of the conditions $s_x(t_{1y})>S_1'$ or $s_x(t_{2y})<S_2'$ is fulfilled. Compared to the procedure described above, computing time can be saved because only one collision time $t_{iy}$ has to be determined. This approach is indicated in FIG. 5A by the points $s_{xn}(t_{1y})$ and $s_{xn}(t_{1y})$. While $s_{xa}(t_{1y})$ is above the projection $S_1'$ (which would lead to a collision), $s_{xn}(t_{1y})$ is below the projection $S_1'$, with the desired effect of collision avoidance.

On the other hand, to check for a collision, it is also possible to first determine the collision time $t_{ix}$, to use this collision time $t_{ix}$ to determine the corresponding position on the Y-axis $s_y(t_{ix})$, and to compare the corresponding position on the Y-axis $s_y(t_{ix})$ with a projection Si" of a keypoint Si on the Y-axis. In this sense, in the case shown in FIG. 5A-5C, a condition to be met for a collision would be $s_y(t_{1x})<S_1''$ (not shown).

If one of the above-mentioned advance calculations before the execution of at least one individual movement TE shows that a collision is to be expected, the individual movement TE causing the collision is not executed and instead a specified braking operation is performed along the movement direction X, Y for which the at least one individual movement not executed is planned, in FIG. 5C the individual movement $TE_X$ in movement direction X. The braking operation is performed for at least the duration of a specified minimum braking time $T_{St}$. A braking operation provides accelerations for the movement of the load 8 in such a manner that the speed of the load 8 is reduced along the direction along which braking is required. Thus, negative accelerations will be given at positive velocities and vice versa. In an advantageous manner, the maximum permissible accelerations can also be used during a braking operation.

After the minimum braking time $T_{St}$, at least one individual movement TE that has not been executed is replanned to a new individual movement TE in a replanning step in an advantageous manner. In a further checking step with the at least one new individual movement TE, it can be checked again whether the replanning trajectory TU to be expected on the basis of the new individual movement TE leads to a collision. If no collision is detected, the newly planned individual movement TE can be executed.

If, however, a collision of the load 8 with an obstacle 11 is predicted again in the preceding verification step, a specified braking operation can advantageously be performed again for at least one further minimum braking time $T_{St}$. After that, a replanning step and a review step following this replanning step can be performed again.

The load 8 can also be brought to a complete standstill by repeatedly performing the braking operation described above. Further planning of individual movements TE then occurs starting from the standstill of the load 8. The possibility of using the method according to the invention to plan corresponding individual movements TE starting from the standstill of the load 8 and thus a trajectory T resulting from these individual movements TE directly opens up the option of also planning fundamentally new trajectories T for the movement of a load 8 using the method according to the invention. If the load 8 is at standstill at the start of a movement operation and no trajectory T is yet known for its movement from the starting point A to the end point E, the standstill at the starting point A can be assumed/specified as the end of a repeatedly executed braking operation and, by applying the method according to the invention, a first trajectory T for transferring the load 8 from standstill at the starting point A to the end point E can also be planned.

Similar to the previously described determination of the collision times $t_{ix}$, $t_{iy}$, a time interval can also be specified for a braking operation in which the load 8 can be brought to a complete standstill. Specifically, the limits $t_k$ (command time point) and $t_k+T_{TE}$ can be specified for this time interval, where $T_{TE}$ describes the duration of a planned individual movement TE. Within this time interval, the load 8 comes to a standstill when a braking operation is repeatedly executed, wherein the specific time point can be determined as before, for example, by a bisection method.

Although the present invention has so far been described in terms of a trajectory T in the X-Y plane $E_{XY}$, it is also possible to extend it to a three-dimensional trajectory T in space. The basic method for replanning even three-dimensional trajectories T on the basis of preferably independent individual movements remains unchanged. If the load 8 is additionally moved along a third movement direction Z by the lifting device 1, at least one individual movement $T_{EZ}$ is also planned for the third movement direction Z in order to replan the trajectory T in accordance with the method according to the invention, which is executed in accordance with a specified movement sequence in addition to the individual movements $TE_X$, $TE_Y$ planned for the first movement direction X and for the second movement direction Y.

For the application of the present invention in the planning of three-dimensional trajectories, it is in many cases advantageous to specify a 3D working area for constraining the movement of the load 8 instead of a two-dimensional working area 15. In contrast to a purely two-dimensional consideration, however, it may also be necessary in the 3D case to take into account the extent of an obstacle 11 as well as the extent of a load 8 in the Z direction. This may be necessary, for example, in assembly halls where obstacles 11 arranged on the walls project into the space of the assembly hall. In such cases, situations may arise in which an obstacle 11 can also be avoided by suitable lowering movements, but this can also be implemented by the method according to the invention.

Figure 6:
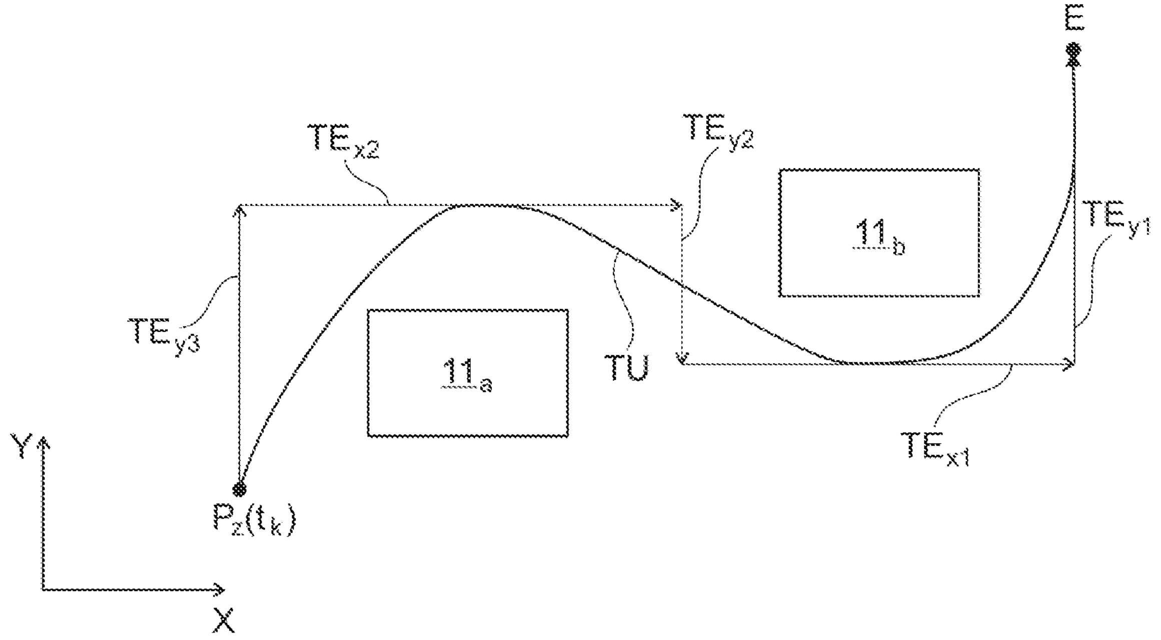

Such a case is shown in FIG. 6, where, as in the previous examples, new individual movements $TE_{X1}$, $TE_{X2}$, $TE_{Y1}$, $TE_{Y2}$, $TE_{Y3}$ are planned at command time point tk, starting from position $P_z(t_k)$. The important case is shown that several individual movements $TE_{X1}$, $TE_{X2}$ are also planned in the X-direction, which is equally possible within the scope of the present invention. In FIG. 6, for example, the obstacle 11*a* is avoided by a lifting movement $TE_{Y3}$ and the obstacle 11*b* is avoided by a lowering movement $TE_{Y2}$. The final transfer to the end point E is performed by a final lifting movement $TE_{Y1}$.

In many practical applications, it can be advantageous in this context to use optical measuring systems to detect the load position $P_Z$ or also obstacles 11, as described for example in EP 3 653 562 A1. Optical measuring systems include suitable camera systems in particular, but also laser scanners. For the purpose of monitoring obstacles 11 that change with respect to their position in the working area 15, a camera can be mounted/installed directly on the trolley of a lifting device 1. Specifically, an optical detection of obstacles can in many cases provide information about how high and at which spatial positions obstacles 11 to be avoided are located. If a change in the position of an obstacle 11 is detected, a new prohibition zone V can be derived from it and the replanning of a trajectory for the movement of a load can be performed as described. In addition to camera and/or laser scanning systems, other approaches to detecting obstacles are also conceivable. In many cases, automation or logistics systems implemented in software also provide information about obstacles 11 to be considered.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A method for controlling a lifting device which moves a load along a first movement direction and along a second movement direction within a specified working area of the lifting device in accordance with a specified trajectory from a starting point to an end point, the method comprising:

at a command time point during the movement of the load, at least one of specifying a new obstacle for the movement of the load, which obstacle is arranged between the position taken on by the load at the command time point and the end point, is specified, or changing an existing obstacle, which is arranged between the position taken on by the load at the command time point and the end point, to a new obstacle for the movement of the load, and taking into account specified kinematic constraints of the lifting device, planning at least one individual movement for the first movement direction and for the second movement direction respectively, which planned individual movements determine a further movement of the load along the respective movement direction from the command time point onwards, wherein at least one individual movement for each movement direction ends in a projection of the end point onto the respective movement direction, wherein the planned individual movements are executed in accordance with a specified movement sequence in order to move the load further along the first movement direction and further along the second movement direction in accordance with a replanning trajectory resulting from the movement sequence of the planned individual movements without colliding with the new obstacle, and wherein the planned individual movements each comprise a position profile that can be continuously differentiated at least four times.

2. The method according to claim 1, wherein the individual movements planned for the first movement direction and for the second movement direction are planned as individual movements that are independent of one another.

3. The method according to claim 1, wherein the position profiles for generating the temporally at least four times continuous differentiability are filtered by a filter with a specifiable time constant.

4. The method according to claim 3, wherein the time constant of the filter is selected as a function of the geometry of the lifting device in order to comply with the specified kinematic constraints of the lifting device in a combined execution of the individual movements.

5. The method according to claim 1, wherein a further individual movement is planned for the second movement direction, which in combination with the individual movement planned along the first movement direction moves the load around the newly specified and/or the changed obstacle, and wherein the second individual movement is executed in accordance with the specified movement sequence before the individual movement already planned for the second movement direction.

6. The method according to claim 1, wherein the movement sequence is specified such that individual movements along the first movement direction and individual movements along the second movement direction are started alternately.

7. The method according to claim 1, wherein the movement sequence is specified such that an individual movement along the first movement direction and an individual movement along the second movement direction are executed overlapping in time.

8. The method according to claim 1, wherein, before the execution of at least one of the planned individual movements, the method further comprises checking whether the expected replanning trajectory leads to a collision of the load with an obstacle specified in the working area.

9. The method according to claim 8, wherein, in order to check whether the expected replanning trajectory leads to a collision of the load with an obstacle specified in the working area, projections of a keypoint derived from the specified obstacle onto the movement directions are determined, wherein a collision time is determined at which the load reaches the projection onto the first movement direction with the individual movement planned for the first movement direction and a collision time is determined, at which the load reaches the projection onto the second movement direction with the individual movement planned for the second movement direction, and wherein the determined collision times are compared with one another.

10. The method according to claim 8, wherein, in order to check whether the expected replanning trajectory leads to a collision of the load with an obstacle specified in the working area, a projection of a keypoint derived from the specified obstacle onto one of the movement directions is determined, wherein a collision time is determined at which the load reaches the determined projection with the individual movement planned for this movement direction, wherein a position of the load on the other movement direction taken on by the load at the determined collision time is determined, and wherein the determined position is compared with a projection of the keypoint onto the movement direction for which the position of the load was determined.

11. The method according to claim 9, wherein the collision times are determined using a root finding method.

12. The method according to claim 1, wherein, in the event of a determined collision with an obstacle, the at least one individual movement is not executed, and wherein instead a specified braking operation is performed for at least the duration of a specified minimum braking time along that movement direction for which the at least one individual movement that was not executed had been planned.

13. The method according to claim 12, wherein instead of the at least one individual movement which has not been executed, a new individual movement is planned for the corresponding movement direction, the method further comprises checking whether the replanning trajectory resulting from the newly planned individual movement leads to a collision of the load with an obstacle specified in the working area, and wherein the new individual movement is executed if no collision is detected, or wherein the specified braking operation is continued for at least one further minimum braking time and a replanning of an individual movement and a check of the replanning trajectory resulting from the replanned individual movement are performed again if a new collision with an obstacle is detected.

14. The method according to claim 1, wherein the position of the load is measured and is used for planning and/or executing the individual movements.

15. The method according to claim 1, wherein the load is additionally moved along a third movement direction by the lifting device, wherein the load is moved within a specified 3D working space in accordance with a three-dimensional trajectory and wherein, for replanning the trajectory, at least one individual movement is also planned for the third movement direction and is executed in accordance with a specified movement sequence in addition to the individual movements planned for the first movement direction and for the second movement direction.

16. A lifting device for moving a load from a starting point to an end point in accordance with a specified trajectory within a specified working area of the lifting device, comprising:

a load receiving element for receiving the load which is connected by at least one retaining element to a running element, the running element being movable along a first movement direction by a running element drive and the load receiving element being movable along a second movement direction by a lifting drive, a computing unit configured to read in, at a command time point during the movement of the load, at least one of an obstacle which is newly specified for the movement of the load and which is arranged between the position taken on by the load at the command time point and the end point, or an existing obstacle which is arranged between the position taken on by the load at the command time point and the end point and is changed to a new obstacle for the movement of the load, the computing unit being further configured to plan, taking into account specified kinematic constraints of the lifting device, an individual movement for the first movement direction and for the second movement direction respectively which define a further movement of the load along the respective direction of movement from the command time point onwards, wherein the individual movements end in each case in a projection of the end point onto the respective direction of movement, wherein the computing unit is configured to control the running element drive and the lifting drive of the lifting device in order to execute a planned individual movement for the first movement direction and for the second movement direction in accordance with a specified movement sequence and thus to move the load further along the first movement direction and along the second movement direction in accordance with a replanning trajectory resulting from the movement sequence of the planned individual movements without colliding with an obstacle, and wherein the planned individual movements each comprise a position profile that can be continuously differentiated at least four times.

* * * * *